(12) United States Patent
Van de Velde et al.

(10) Patent No.: US 12,413,500 B2
(45) Date of Patent: Sep. 9, 2025

(54) SERVICE DIFFERENTIATION BASED ON CONSTRAINED NETWORK TOPOLOGY SLICING

(71) Applicant: NOKIA SOLUTIONS AND NETWORKS OY, Espoo (FI)

(72) Inventors: Gunter Van de Velde, Lint (BE); Matthew Bocci, East Sussex (GB)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/168,040

(22) Filed: Feb. 4, 2021

(65) Prior Publication Data
US 2022/0247663 A1 Aug. 4, 2022

(51) Int. Cl.
*H04L 45/02* (2022.01)
*H04L 41/0803* (2022.01)

(52) U.S. Cl.
CPC .......... *H04L 45/02* (2013.01); *H04L 41/0803* (2013.01)

(58) Field of Classification Search
CPC ....... H04L 45/02; H04L 45/741; H04L 47/70; H04L 47/829; H04L 47/805; H04L 47/24; H04L 41/0893; H04L 45/302; H04L 45/32; H04L 41/08; H04L 41/0803; H04L 41/122; H04L 41/22; H04L 43/0852; H04L 45/121; H04L 45/04; H04L 45/12; G06F 11/1464; G06F 11/1451; G06F 11/1469; G06F 11/006; H04N 1/00244; H04N 1/00344; H04N 1/00084
See application file for complete search history.

(56) References Cited

U.S. PATENT DOCUMENTS

| | | | |
|---|---|---|---|
| 10,601,724 B1 * | 3/2020 | Filsfils | H04L 47/10 |
| 11,071,017 B2 * | 7/2021 | Dong | H04W 4/50 |
| 2020/0008067 A1 * | 1/2020 | Filsfils | H04W 16/02 |

(Continued)

FOREIGN PATENT DOCUMENTS

| | | |
|---|---|---|
| CN | 1625872 A | 6/2005 |
| CN | 101641913 A | 2/2010 |

(Continued)

OTHER PUBLICATIONS

Shaofu, "IGP Flexible Algorithm Optimization for Network Slicing draft-peng-lsr-flex-algo-opt-slicing-02", (Year: 2020).*

(Continued)

*Primary Examiner* — Messeret F Gebre
(74) *Attorney, Agent, or Firm* — Tong, Rea, Bentley & Kim, LLC

(57) ABSTRACT

Various example embodiments for supporting service differentiation in a communication network are presented herein. The service differentiation may be supported in a constrained network topology of the communication network. The service differentiation may be supported in the constrained network topology of the communication network based on use of one or more constrained network topology slices supported for the constrained network topology of the communication network. The constrained network topology of the communication network may be a Flexible Algorithm topology, in which case the constrained network topology slices may be Flexible Algorithm topology slices.

19 Claims, 7 Drawing Sheets

(56) References Cited

U.S. PATENT DOCUMENTS

| | | | |
|---|---|---|---|
| 2020/0128445 A1 | 4/2020 | Dong | |
| 2020/0244588 A1 | 7/2020 | Filsfils et al. | |
| 2022/0200893 A1* | 6/2022 | Yao | H04L 41/5054 |
| 2023/0033298 A1* | 2/2023 | Peng | H04L 41/5022 |
| 2023/0283568 A1* | 9/2023 | Filsfils | H04L 43/0888 |
| | | | 370/235 |

FOREIGN PATENT DOCUMENTS

| | | | | |
|---|---|---|---|---|
| CN | 105247822 A | | 1/2016 | |
| CN | 109565467 A | | 4/2019 | |
| CN | 111225419 A | | 6/2020 | |
| CN | 111835637 A | | 10/2020 | |
| CN | 112311673 A | | 2/2021 | |
| CN | 113285876 A | * | 8/2021 | |
| EP | 3648420 A1 | | 5/2020 | |
| WO | WO-2022110535 A1 | * | 6/2022 | H04L 45/74 |

OTHER PUBLICATIONS

J. Zhou, Z. Zhang and N. Zhou, "A Segment List Management Algorithm Based on Segment Routing," 2019 IEEE 11th International Conference on Communication Software and Networks (ICCSN), Chongqing, China, 2019, pp. 297-302, doi: 10.1109/ICCSN.2019.8905397. (Year: 2019).*

A. Cai, Z. Fan, K. Xu, M. Zukerman and C. -K. Chan, "Elastic versus WDM networks with dedicated multicast protection," in Journal of Optical Communications and Networking, vol. 9, No. 11, pp. 921-933, Nov. 2017, doi: 10.1364/JOCN.9.000921. (Year: 2017).*

EP Search Report mailed in corresponding EP Application No. 22151848.3 on Jul. 4, 2022, 12 pages.

Saad, T., et al., "Scalable Network Slicing over SR Networks," draft-bestbar-spring-scalable-ns-00, Spring Working Group, Internet Engineering Task Force, Dec. 16, 2022, 10 pages.

Farrel, Ed., A., "Overview and Principles of Internet Traffic Engineering," draft-ietf-teas-rfc3272bis-10, TEAS Working Group, Internet Engineering Task Force, Dec. 28, 2020, 82 pages.

Psenak, P., et al., "IGP Flexible Algorithm," IETF, Network Working Group, draft-ietf-lsr-flex-algo-13, Oct. 22, 2020, 37 pages.

Blake, S., C., et al., "An Architecture for Differentiated Services," IETF, RFC 2475, Dec. 1998, 36 pages.

Awduche, D., et al., "RSVP-TE: Extensions to RSVP for LSP Tunnels," IETF, RFC 3209, Dec. 2001, 61 pages.

Filsfils, C., et al., "Segment Routing Architecture," IETF, RFC 8402, Jul. 2018, 32 pages.

Office Action received in corresponding European Patent Application No. 22 151 848.3-1215, dated Aug. 29, 2024, 8 pages.

1st Office Action and Search Report, CN 202210112512.1, Nov. 23, 2023, 8 pages.

Office Action received for corresponding Chinese Patent Application No. 202210112512.1, dated May 22, 2024, 7 pages of Office Action and 8 pages of translation, 15 total pages.

* cited by examiner

SERVICE DIFFERENTIATION BASED ON CONSTRAINED NETWORK TOPOLOGY SLICING

TECHNICAL FIELD

Various example embodiments relate generally to communication systems and, more particularly but not exclusively, to supporting service differentiation in communication systems.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support, by a router for a flexible algorithm topology configured to provide a constrained topology graph on a physical network topology, a flexible algorithm topology slice, wherein the flexible algorithm topology slice is configured to provide service differentiation within the flexible algorithm topology. In at least some example embodiments, the flexible algorithm topology slice is configured to provide service differentiation within the flexible algorithm topology based on a slice identifier associated with a segment routing node identifier. In at least some example embodiments, the flexible algorithm topology slice is configured to provide service differentiation within the flexible algorithm topology based on a set of quality-of-service properties for the flexible algorithm topology slice that is different than a set of quality-of-service properties for the flexible algorithm topology. In at least some example embodiments, to support the flexible algorithm topology slice, the set of instructions is configured to, when executed by the at least one processor, cause the apparatus to advertise, by the router, a segment routing node identifier for the flexible algorithm topology slice and an associated slice identifier for the flexible algorithm topology slice. In at least some example embodiments, the segment routing node identifier for the flexible algorithm topology slice and the associated slice identifier for the flexible algorithm topology slice are advertised using a routing protocol. In at least some example embodiments, the slice identifier for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, to support the flexible algorithm topology slice, the set of instructions is configured to, when executed by the at least one processor, cause the apparatus to advertise, by the router, a slice identifier for the flexible algorithm topology slice and a flexible algorithm topology slice description for the flexible algorithm topology slice. In at least some example embodiments, the slice identifier for the flexible algorithm topology slice and the flexible algorithm topology slice description for the flexible algorithm topology slice are advertised using a routing protocol. In at least some example embodiments, the flexible algorithm topology slice description for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, to support the flexible algorithm topology slice, the set of instructions is configured to, when executed by the at least one processor, cause the apparatus to receive, by the router from a segment routing enabled router, a segment routing node identifier for the flexible algorithm topology slice and an associated slice identifier for the flexible algorithm topology slice. In at least some example embodiments, to support the flexible algorithm topology slice, the set of instructions is configured to, when executed by the at least one processor, cause the apparatus to receive, by the router from a segment routing enabled router or a controller, a slice identifier for the flexible algorithm topology slice and a flexible algorithm topology slice description for the flexible algorithm topology slice. In at least some example embodiments, to support the flexible algorithm topology slice, the set of instructions is configured to, when executed by the at least one processor, cause the apparatus to receive, by the router, a segment routing node identifier for the flexible algorithm topology slice and an associated slice identifier for the flexible algorithm topology slice, receive, by the router, the slice identifier for the flexible algorithm topology slice and a flexible algorithm topology slice description for the flexible algorithm topology slice, and generate, by the router, a segment routing identifier forwarding construct configured to map the segment routing node identifier for the flexible algorithm topology slice and the slice identifier for the flexible algorithm topology slice to the flexible algorithm topology description for the flexible algorithm topology slice. In at least some example embodiments, to support the flexible algorithm topology slice, the set of instructions is configured to, when executed by the at least one processor, cause the apparatus to receive, by the router, a packet including a segment routing node identifier for the flexible algorithm topology and send, by the router using the flexible algorithm topology rather than the flexible algorithm topology slice, the packet. In at least some example embodiments, to support the flexible algorithm topology slice, the set of instructions is configured to, when executed by the at least one processor, cause the apparatus to receive, by the router, a packet including a segment routing node identifier for the flexible algorithm topology slice and send, by the router using the flexible algorithm topology slice rather than the flexible algorithm topology, the packet. In at least some example embodiments, to support the flexible algorithm topology slice, the set of instructions is configured to, when executed by the at least one processor, cause the apparatus to receive, by the router, a packet including a segment routing node identifier for the flexible algorithm topology slice and send, by the router using the flexible algorithm topology rather than the flexible algorithm topology slice based on a determination that the segment routing node identifier for the flexible algorithm topology slice is not recognized by the router, the packet. In at least some example embodiments, the flexible algorithm topology is based on at least one of a delay metric, a routing protocol metric, or a traffic engineering metric. In at least some example embodiments, the flexible algorithm topology slice is based on at least one of a quality-of-service parameter, a traffic metering parameter, a flow enhancer parameter, a security parameter, or an optimization parameter.

In at least some example embodiments, a non-transitory computer-readable medium stores a set of instructions configured to cause an apparatus to support, by a router for a flexible algorithm topology configured to provide a constrained topology graph on a physical network topology, a flexible algorithm topology slice, wherein the flexible algorithm topology slice is configured to provide service differentiation within the flexible algorithm topology. In at least some example embodiments, the flexible algorithm topology slice is configured to provide service differentiation within the flexible algorithm topology based on a slice identifier associated with a segment routing node identifier. In at least some example embodiments, the flexible algorithm topology slice is configured to provide service differentiation within the flexible algorithm topology based on a set of quality-of-service properties for the flexible algorithm topology slice that is different than a set of quality-of-service properties for the flexible algorithm topology. In at least some example embodiments, to support the flexible algorithm topology slice, the set of instructions is configured to cause the apparatus to advertise, by the router, a segment routing node identifier for the flexible algorithm topology slice and an associated slice identifier for the flexible algorithm topology slice. In at least some example embodiments, the segment routing node identifier for the flexible algorithm topology slice and the associated slice identifier for the flexible algorithm topology slice are advertised using a routing protocol. In at least some example embodiments, the slice identifier for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, to support the flexible algorithm topology slice, the set of instructions is configured to cause the apparatus to advertise, by the router, a slice identifier for the flexible algorithm topology slice and a flexible algorithm topology slice description for the flexible algorithm topology slice. In at least some example embodiments, the slice identifier for the flexible algorithm topology slice and the flexible algorithm topology slice description for the flexible algorithm topology slice are advertised using a routing protocol. In at least some example embodiments, the flexible algorithm topology slice description for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, to support the flexible algorithm topology slice, the set of instructions is configured to cause the apparatus to receive, by the router from a segment routing enabled router, a segment routing node identifier for the flexible algorithm topology slice and an associated slice identifier for the flexible algorithm topology slice. In at least some example embodiments, to support the flexible algorithm topology slice, the set of instructions is configured to cause the apparatus to receive, by the router from a segment routing enabled router or a controller, a slice identifier for the flexible algorithm topology slice and a flexible algorithm topology slice description for the flexible algorithm topology slice. In at least some example embodiments, to support the flexible algorithm topology slice, the set of instructions is configured to cause the apparatus to receive, by the router, a segment routing node identifier for the flexible algorithm topology slice and an associated slice identifier for the flexible algorithm topology slice, receive, by the router, the slice identifier for the flexible algorithm topology slice and a flexible algorithm topology slice description for the flexible algorithm topology slice, and generate, by the router, a segment routing identifier forwarding construct configured to map the segment routing node identifier for the flexible algorithm topology slice and the slice identifier for the flexible algorithm topology slice to the flexible algorithm topology description for the flexible algorithm topology slice. In at least some example embodiments, to support the flexible algorithm topology slice, the set of instructions is configured to cause the apparatus to receive, by the router, a packet including a segment routing node identifier for the flexible algorithm topology and send, by the router using the flexible algorithm topology rather than the flexible algorithm topology slice, the packet. In at least some example embodiments, to support the flexible algorithm topology slice, the set of instructions is configured to cause the apparatus to receive, by the router, a packet including a segment routing node identifier for the flexible algorithm topology slice and send, by the router using the flexible algorithm topology slice rather than the flexible algorithm topology, the packet. In at least some example embodiments, to support the flexible algorithm topology slice, the set of instructions is configured to cause the apparatus to receive, by the router, a packet including a segment routing node identifier for the flexible algorithm topology slice and send, by the router using the flexible algorithm topology rather than the flexible algorithm topology slice based on a determination that the segment routing node identifier for the flexible algorithm topology slice is not recognized by the router, the packet. In at least some example embodiments, the flexible algorithm topology is based on at least one of a delay metric, a routing protocol metric, or a traffic engineering metric. In at least some example embodiments, the flexible algorithm topology slice is based on at least one of a quality-of-service parameter, a traffic metering parameter, a flow enhancer parameter, a security parameter, or an optimization parameter.

In at least some example embodiments, a method includes supporting, by a router for a flexible algorithm topology configured to provide a constrained topology graph on a physical network topology, a flexible algorithm topology slice, wherein the flexible algorithm topology slice is configured to provide service differentiation within the flexible algorithm topology. In at least some example embodiments, the flexible algorithm topology slice is configured to provide service differentiation within the flexible algorithm topology based on a slice identifier associated with a segment routing node identifier. In at least some example embodiments, the flexible algorithm topology slice is configured to provide service differentiation within the flexible algorithm topology based on a set of quality-of-service properties for the flexible algorithm topology slice that is different than a set of quality-of-service properties for the flexible algorithm topology. In at least some example embodiments, supporting the flexible algorithm topology slice includes advertising, by the router, a segment routing node identifier for the flexible algorithm topology slice and an associated slice identifier for the flexible algorithm topology slice. In at least some example embodiments, the segment routing node identifier for the flexible algorithm topology slice and the associated slice identifier for the flexible algorithm topology slice are advertised using a routing protocol. In at least some example embodiments, the slice identifier for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, supporting the flexible algorithm topology slice includes advertising, by the router, a slice identifier for the flexible algorithm topology slice and a flexible algorithm topology slice description for the flexible algorithm topology slice. In at least some example embodiments, the slice identifier for the flexible algorithm topology slice and the flexible algorithm topology slice description for the flexible algorithm topology slice are advertised using a routing protocol. In at least some example embodiments, the flexible algorithm topology slice description for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, supporting the flexible algorithm topology slice includes receiving, by the router from a segment routing enabled router, a segment routing node identifier for the flexible algorithm topology slice and an associated slice identifier for the flexible algorithm topology slice. In at least some example embodiments, supporting the flexible algorithm topology slice includes receiving, by the router from a segment routing enabled router or a controller, a slice identifier for the flexible algorithm topology slice and a flexible algorithm topology slice description for the flexible algorithm topology slice. In at least some example embodiments, supporting the flexible algorithm topology slice includes receiving, by the router, a segment routing node identifier for the flexible algorithm topology slice and an associated slice identifier for the flexible algorithm topology slice, receiving, by the router, the slice identifier for the flexible algorithm topology slice and a flexible algorithm topology slice description for the flexible algorithm topology slice, and generating, by the router, a segment routing identifier forwarding construct configured to map the segment routing node identifier for the flexible algorithm topology slice and the slice identifier for the flexible algorithm topology slice to the flexible algorithm topology description for the flexible algorithm topology slice. In at least some example embodiments, supporting the flexible algorithm topology slice includes receiving, by the router, a packet including a segment routing node identifier for the flexible algorithm topology and sending, by the router using the flexible algorithm topology rather than the flexible algorithm topology slice, the packet. In at least some example embodiments, supporting the flexible algorithm topology slice includes receiving, by the router, a packet including a segment routing node identifier for the flexible algorithm topology slice and sending, by the router using the flexible algorithm topology slice rather than the flexible algorithm topology, the packet. In at least some example embodiments, supporting the flexible algorithm topology slice includes receiving, by the router, a packet including a segment routing node identifier for the flexible algorithm topology slice and sending, by the router using the flexible algorithm topology rather than the flexible algorithm topology slice based on a determination that the segment routing node identifier for the flexible algorithm topology slice is not recognized by the router, the packet. In at least some example embodiments, the flexible algorithm topology is based on at least one of a delay metric, a routing protocol metric, or a traffic engineering metric. In at least some example embodiments, the flexible algorithm topology slice is based on at least one of a quality-of-service parameter, a traffic metering parameter, a flow enhancer parameter, a security parameter, or an optimization parameter.

In at least some example embodiments, an apparatus includes means for supporting, by a router for a flexible algorithm topology configured to provide a constrained topology graph on a physical network topology, a flexible algorithm topology slice, wherein the flexible algorithm topology slice is configured to provide service differentiation within the flexible algorithm topology. In at least some example embodiments, the flexible algorithm topology slice is configured to provide service differentiation within the flexible algorithm topology based on a slice identifier associated with a segment routing node identifier. In at least some example embodiments, the flexible algorithm topology slice is configured to provide service differentiation within the flexible algorithm topology based on a set of quality-of-service properties for the flexible algorithm topology slice that is different than a set of quality-of-service properties for the flexible algorithm topology. In at least some example embodiments, the means for supporting the flexible algorithm topology slice includes means for advertising, by the router, a segment routing node identifier for the flexible algorithm topology slice and an associated slice identifier for the flexible algorithm topology slice. In at least some example embodiments, the segment routing node identifier for the flexible algorithm topology slice and the associated slice identifier for the flexible algorithm topology slice are advertised using a routing protocol. In at least some example embodiments, the slice identifier for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, the means for supporting the flexible algorithm topology slice includes means for advertising, by the router, a slice identifier for the flexible algorithm topology slice and a flexible algorithm topology slice description for the flexible algorithm topology slice. In at least some example embodiments, the slice identifier for the flexible algorithm topology slice and the flexible algorithm topology slice description for the flexible algorithm topology slice are advertised using a routing protocol. In at least some example embodiments, the flexible algorithm topology slice description for the flexible algorithm topology slice is advertised using at least one optional transitive opaque extension of the routing protocol. In at least some example embodiments, the routing protocol includes at least one of an Open Shortest Path First (OSPF) protocol, an Intermediate-System-to-Intermediate-System (IS-IS) protocol, or a Border Gateway Protocol-Link State (BGP-LS) protocol. In at least some example embodiments, the means for supporting the flexible algorithm topology slice includes means for receiving, by the router from a segment routing enabled router, a segment routing node identifier for the flexible algorithm topology slice and an associated slice identifier for the flexible algorithm topology slice. In at least some example embodiments, the means for supporting the flexible algorithm topology slice includes means for receiving, by the router from a segment routing enabled router or a controller, a slice identifier for the flexible algorithm topology slice and a flexible algorithm topology slice description for the flexible algorithm topology slice. In at least some example embodiments, the means for supporting the flexible algorithm topology slice includes means for receiving, by the router, a segment routing node identifier for the flexible algorithm topology slice and an associated slice identifier for the flexible algorithm topology slice, means for receiving, by the router, the slice identifier for the flexible algorithm topology slice and a flexible algorithm topology slice description for the flexible algorithm topology slice, and means for generating, by the router, a segment routing identifier forwarding construct configured to map the segment routing node identifier for the flexible algorithm topology slice and the slice identifier for the flexible algorithm topology slice to the flexible algorithm topology description for the flexible algorithm topology slice. In at least some example embodiments, the means for supporting the flexible algorithm topology slice includes means for receiving, by the router, a packet including a segment routing node identifier for the flexible algorithm topology and means for sending, by the router using the flexible algorithm topology rather than the flexible algorithm topology slice, the packet. In at least some example embodiments, the means for supporting the flexible algorithm topology slice includes means for receiving, by the router, a packet including a segment routing node identifier for the flexible algorithm topology slice and means for sending, by the router using the flexible algorithm topology slice rather than the flexible algorithm topology, the packet. In at least some example embodiments, the means for supporting the flexible algorithm topology slice includes means for receiving, by the router, a packet including a segment routing node identifier for the flexible algorithm topology slice and means for sending, by the router using the flexible algorithm topology rather than the flexible algorithm topology slice based on a determination that the segment routing node identifier for the flexible algorithm topology slice is not recognized by the router, the packet. In at least some example embodiments, the flexible algorithm topology is based on at least one of a delay metric, a routing protocol metric, or a traffic engineering metric. In at least some example embodiments, the flexible algorithm topology slice is based on at least one of a quality-of-service parameter, a traffic metering parameter, a flow enhancer parameter, a security parameter, or an optimization parameter.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting service differentiation in a communication network are presented herein. The service differentiation may be supported in a constrained network topology of the communication network. The service differentiation may be supported in the constrained network topology of the communication network based on use of one or more constrained network topology slices supported for the constrained network topology of the communication network. The constrained network topology of the communication network may be a Flexible Algorithm topology, in which case the constrained network topology slices may be Flexible Algorithm topology slices. The Flexible Algorithm topology and associated Flexible Algorithm topology slices may be based on a routing protocol, such as based on an Interior Gateway Protocol (IGP) (e.g., Open Shortest Path First (OSPF), Intermediate-System-to-Intermediate-System (IS-IS), or the like), Border Gateway Protocol-Link State (BGP-LS), or the like. The Flexible Algorithm topology and associated Flexible Algorithm topology slices, as primarily discussed herein, may be based on an IGP Flexible Algorithm implementation, such as the IGP Flexible Algorithm implementation which is defined in the Internet Engineering Task Force (IETF) "draft-ietf-lsr-flex-algo" draft standard document, or any other suitable type of Flexible Algorithm implementation supporting constrained network topologies. It will be appreciated that, while primarily presented with respect to example embodiments in which the constrained network topology of the communication network is based on Flexible Algorithm implementations, various example embodiments presented herein may be used in or adapted for use in various other types of constrained network topologies. It will be appreciated that these and various other example embodiments and associated advantages or potential advantages of supporting service differentiation in a communication network may be further understood by way of reference to the various figures, which are discussed further below.

Figure 1:
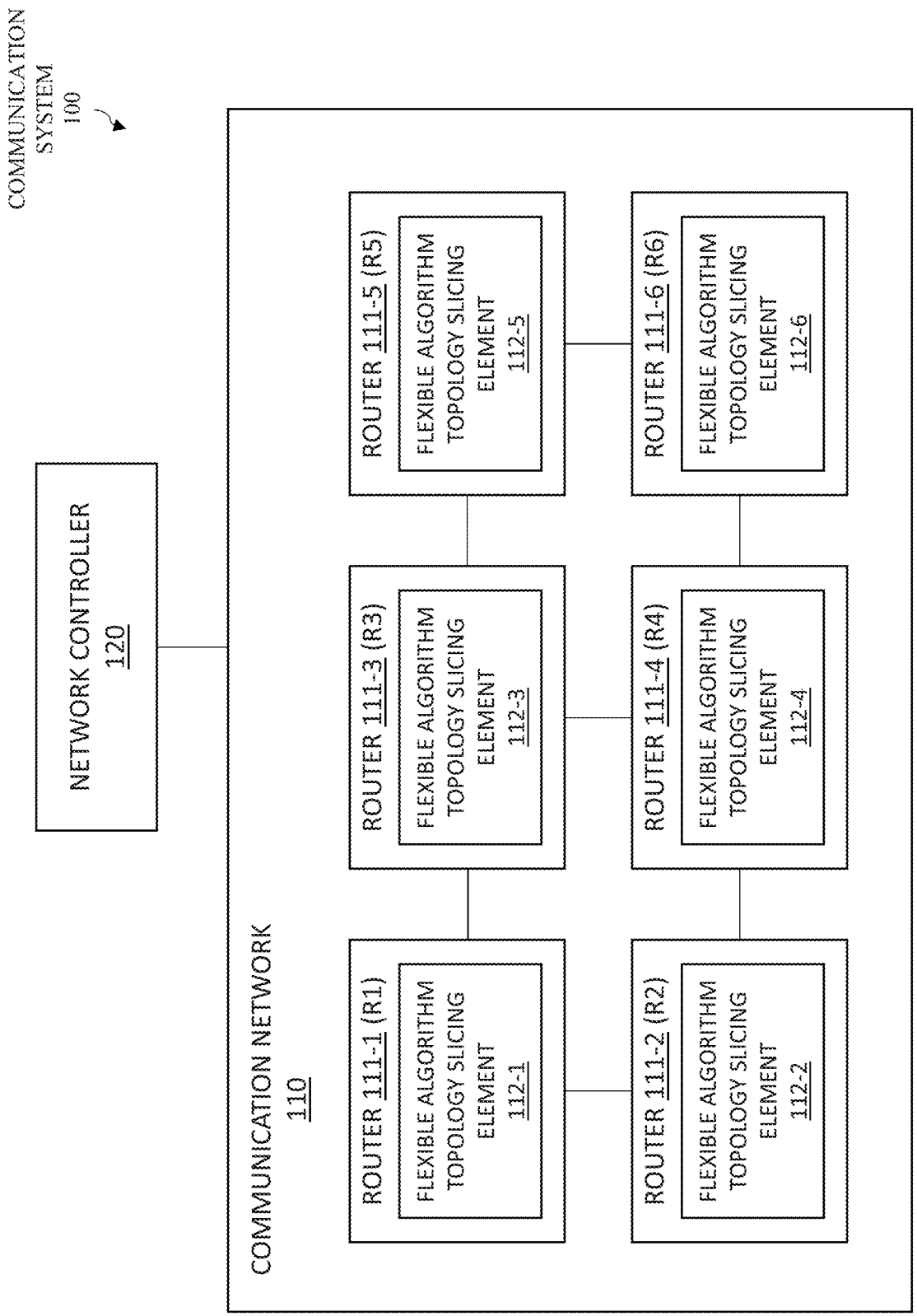
FIG. 1 depicts an example embodiment of a communication system configured to support Flexible Algorithm Topology Slicing.

FIG. 1 depicts an example embodiment of a communication system configured to support Flexible Algorithm Topology Slicing. In FIG. 1, communication system 100 includes a network 110 and a network controller 120. The network 110 includes six routers 111-1-111-6 (collectively, routers 111 which also are labeled as R1 through R6, respectively), which are interconnected via communication links. The network 110 provides a physical network topology. The routers 111 of the network 110 may be configured to support use of constrained network topologies built on physical topology. The routers 111 of the network 110 may be configured to support use of constrained network topologies based on Flexible Algorithms, which are referred to as Flexible Algorithm topologies. The routers 111 of the network 110 may be configured to support Flexible Algorithm topology slices for supporting service differentiation within Flexible Algorithm topologies. The routers 111 of the network 110 include Flexible Algorithm Topology Slicing elements 112 (illustratively, Flexible Algorithm Topology Slicing elements 112-1-112-6 on routers 111-1-111-6, respectively) configured to support Flexible Algorithm topologies and associated Flexible Algorithm topology slices for supporting service differentiation within Flexible Algorithm topologies. The network controller 120 may be configured to provide control functions for the network 110, including control functions related to supporting Flexible Algorithm topologies and associated Flexible Algorithm topology slices for supporting service differentiation within Flexible Algorithm topologies. It will be appreciated that the communication system 100 is merely one example of a communication system which may support Flexible Algorithm Topology Slicing. Various example embodiments for support supporting service differentiation within Flexible Algorithm topologies may be further understood by first considering various aspects of using Flexible Algorithms as a mechanism for supporting constrained network topologies on a physical network topology.

Flexible Algorithms provides a mechanism for supporting constrained network topologies on a physical network topology. Flexible Algorithms for Segment Routing (SR) are defined in the IETF "draft-ietf-lsr-flex-algo" draft standard document. When standardized SR Flexible Algorithms are used, then each Flexible Algorithm results in a constrained network topology (e.g., a topologically-constrained forwarding graph) for all traffic that flows through the constrained network topology. The Flexible Algorithms may be defined based on various metrics (e.g., routing protocol metrics (e.g., IGP metrics), delay, TE metrics, or the like) and, thus, the associated constrained network topologies constructed based on the Flexible Algorithms may be constructed by based on metrics (e.g., minimization of one or more metrics) and exclusion of links or link properties (e.g., links having a particular "color", link-affinity, Standard Local Route Groups (SLRGs), or the like). When traffic is steered in a constrained network topology based on a Flexible Algorithm, all of the traffic is serviced by all nodes (ingress, transit, and egress) identically. The IETF "draft-ietf-lsr-flex-algo" draft standard document indicates that Flexible Algorithms may be assigned ID numbers in the range 128-255. For example, an operator may define two Flexible Algorithms as follows: (1) Algorithm-128 (which also may be referred to as topology-128) which may be defined as the shortest path using a delay metric and including all links and (2) Algorithm-129 (which also may be referred to as topology-129) which may be defined as the shortest path utilizing the default IGP metric while excluding links colored with administrative group color 'red'. It will be appreciated that fewer or more Flexible Algorithms may be used, Flexible Algorithms may be defined in other ways, or the like, as well as various combinations thereof. It is noted that any conditioning of the traffic is not managed by a central controller, which may involve configuration of every node involved by imposing new configuration properties each time a network or datapath event happens.

Flexible Algorithm Topology Slicing, as indicated hereinabove, is configured to overcome such limitations of Flexible Algorithms that are based on IETF "draft-ietf-lsr-flex-algo" draft standard document by supporting service differentiation for Flexible Algorithms based on use of Flexible Algorithm topology slices. The use of Flexible Algorithm topology slices obviates the need for all of the traffic that is steered onto a Flexible Algorithm forwarding graph to be handled identically since one or more Flexible Algorithm topology slices within the Flexible Algorithm forwarding graph may be used to handle different portions of the traffic differently across the various nodes (i.e., ingress, transit, and egress) of the Flexible Algorithm forwarding graph. The differentiated services may be based on one or more of quality-of-service (QoS) levels where the QoS levels may be defined based on various QoS parameters (e.g., delay, jitter, loss, or the like), may be specified in various ways (e.g., GOLD level, SILVER level, BRONZE level, BEST EFFORT level, or the like), or the like, as well as various combinations thereof. The differentiated services include one or more value-added services (e.g., traffic metering, security, traffic optimizers, or the like). It will be appreciated that the differentiated services may be based on various combinations of such service definitions and/or services. The use of Flexible Algorithm technology slices enables use of differentiated services in a central SDN controlled and scalable framework. The use of Flexible Algorithm topology slices may be fully backward compatible with existing SR routing technology including SR Flexible Algorithm technology. Various aspects of Flexible Algorithm Topology Slicing are discussed further below.

Flexible Algorithm Topology Slicing may be supported based on various extensions to the IETF "draft-ietf-lsr-flex-algo" draft standard document. Various example embodiments presented herein may be configured to enable nodes in a Flexible Algorithm forwarding graph to advertise participation within Flexible Algorithm topology slices of the Flexible Algorithm topology. Various example embodiments presented herein may be configured to provide a centralized mechanism for advertising Flexible Algorithm topology slice properties to nodes for providing nodes with the properties to be applied within the Flexible Algorithm topology slices of the Flexible Algorithm forwarding graph. In this manner, each of the various types of nodes (ingress, transit, and egress) in a Flexible Algorithm topology are able to autodiscover Flexible Algorithm topology slice properties and Flexible Algorithm topology slice participants for use in handling traffic in the Flexible Algorithm topology using available Flexible Algorithm topology slices. In this manner, Flexible Algorithm Topology Slicing enables each node along the Flexible Algorithm forwarding graph to be automatically enhanced with Flexible Algorithm topology slice properties (e.g. QoS, traffic metering, flow enhancement, security, optimization, or the like) to support service differentiation for traffic within the Flexible Algorithm forwarding graph. It is noted that the advertising of the Flexible Algorithm topology slice properties and Flexible Algorithm topology slice participants may be performed using various protocols, including routing protocols such as IGPs (e.g., OSPF, IS-IS, or the like), BGP-LS, or the like, as well as various combinations thereof. It is noted that the advertising of the Flexible Algorithm topology slice properties and Flexible Algorithm topology slice participants may be performed using opaque routing protocol extensions of the routing protocol used for advertising of the Flexible Algorithm topology slice properties and Flexible Algorithm topology slice participants (e.g., opaque IGP extensions, opaque BGP-LS extensions, or the like).

Flexible Algorithm Topology Slicing may be further understood based on consideration of the example above in which a network supports a Flexible Algorithm topology-128 that uses the shortest path using a delay metric and including all links and a Flexible Algorithm topology-129 that uses the shortest path using the default IGP metric and excluding links colored with the administrative. In this example, assume that two Flexible Algorithm topology slices are defined as follows: (1) slice-1 means to use the high priority QoS queue service and (2) slice-2 means to use increased security services. Then, Flexible Algorithm Topology Slicing, based on advertisement of participation within the slices and slice properties of the slices, enables the following slices to be supported in order to support service differentiation within the Flexible Algorithm forwarding graphs of the Flexible Algorithms: (1) in the Flexible Algorithm topology-128, in addition to the topology-128 which is the default service for the lowest delay path, topology-128.1 is a slice for the lowest delay path with high priority QoS and topology-128.2 is a slice for the lowest delay path with increased security services and (2) in the Flexible Algorithm topology-129, in addition to the topology-129 which is the default service for the best IGP path, topology-129.1 is the slice for the best IGP path using approved links with high priority QoS and topology-129.2 is the slice for the best IGP path using approved links with increased security.

It will be appreciated that, although primarily presented as being extensions to the IETF "draft-ietf-lsr-flex-algo" draft standard document, the various extensions presented herein may be applied within various other contexts to support slicing of constrained network topologies of various other types of communication networks and, thus, to support service differentiation within constrained network topologies of various other types of communication networks. For example, various example embodiments presented herein may be configured to enable nodes to advertise participation within constrained network topology slices (e.g., within Flexible Algorithm topology slices where the constrained network topology is based on Flexible Algorithms). For example, various example embodiments presented herein may be configured to provide a centralized mechanism for advertising constrained network topology slice properties (e.g., Flexible Algorithm topology slice properties where the constrained network topology is based on Flexible Algorithms). In this manner, each of the various types of nodes (ingress, transit, and egress) in a constrained network topology are able to autodiscover constrained network topology slice properties and constrained network topology slice participants for use in handling traffic in the constrained network topology using available constrained network topology slices. It will be appreciated that such example embodiments may be further understood by considering these example embodiments within the context of Flexible Algorithms.

In at least some example embodiments, the Flexible Algorithm Topology Slicing capability may be configured to allow a router to advertise, for each advertised node SID, an optional Flexible Algorithm slice identifier to support SID-based differentiated service treatment. Flexible Algorithms allow a router to advertise reachability to its SR node SID per Flexible Algorithm, and the optional Flexible Algorithm slice identifier may be added as optional transitive opaque information to the SR node SID. The Flexible Algorithm slice identifiers may be advertised using IGPs. This Flexible Algorithm Topology Slicing inherits the standard Flexible Algorithms Topology graphs. This Flexible Algorithm Topology Slicing also provides backward compatibility when a node does not support the extensions or if a topology slice configuration is unknown/unsupported (e.g., use of an optional transitive opaque IGP extension allows a node not understanding the extension to skip the decoding and operate as if the information never existed).

In at least some example embodiments, the Flexible Algorithm Topology Slicing capability may be configured to allow a central controller that is advertising the Flexible Algorithm FADs to advertise Flexible Algorithm topology slice configurations. The Flexible Algorithm topology slice configurations for Flexible Algorithm topology slices may include characteristics such as QoS parameters for the Flexible Algorithm topology slices, security profiles for the Flexible Algorithm topology slices (e.g., based on one or more security parameters), flow enhancers for the Flexible Algorithm topology slices (e.g., based on one or more flow enhancer parameters), traffic metering for the Flexible Algorithm topology slices (e.g., based on one or more traffic metering parameters), optimization for the Flexible Algorithm topology slices (e.g., based on one or more optimization parameters), or the like, as well as various combinations thereof. It will be appreciated that various other value added services may be supported for the Flexible Algorithm topology slices. The Flexible Algorithm topology slice configurations may be advertised by adding optional transitive opaque Flexible Algorithm Definition (FAD) Extensions to advertise, for a Flexible Algorithm slice identifier, the associated service properties for the slice (which also may be referred to as slice configuration extensions). The slice configurations may be advertised using IGPs. The routers participating in Flexible Algorithms will receive the information, including the FADs for the Flexible Algorithms and the associated Flexible Algorithm topology slice configurations for the Flexible Algorithms, and will maintain mappings of the Flexible Algorithm slice identifiers to the Flexible Algorithm topology slice configurations for supporting Flexible Algorithm topology slices. This Flexible Algorithm Topology Slicing also provides backward compatibility when a node does not support the extensions (e.g., use of an optional transitive opaque IGP extension allows a node not understanding the extension to skip the decoding and operate as if the information never existed).

Flexible Algorithm Topology Slicing, configured to support service differentiation within Flexible Algorithms, may be supported by routers configured to perform Flexible Algorithm functions as well as extensions to Flexible Algorithm functions. Each router advertises, in its IGP, its node IP address. Each router advertises the SR SIDs associated with the node IP address. Each router, for each SID associated with a Flexible Algorithm and associated Flexible Algorithm topology, may advertise one or more Flexible Algorithm slice identifiers for one or more Flexible Algorithm topology slices. The entity (e.g., router, central controller, or the like) advertising the FADs may, for each of the Flexible Algorithm topology slices, advertise the Flexible Algorithm topology slice configuration for the Flexible Algorithm topology slice, respectively. A router participating in Flexible Algorithm Topology slicing may be configured to (1) receive, from the other routers via IGP, the node IP addresses of the other routers in the network, (2) receive, from the other routers via IGP, the node SIDs of the SR-enabled routers in the network, (3) receive, from the IGP for each received SID, the Flexible Algorithm topology slice identifier (referred to hereinabove as a first extension of Flexible Algorithm), (4) receive, for each of the Flexible Algorithm topology slices, the Flexible Algorithm topology slice configuration of the Flexible Algorithm topology slice (referred to hereinabove as a second extension of Flexible Algorithm), and (5) build an SID forwarding construct, using the Flexible Algorithm topology slice configuration(s) of the Flexible Algorithm topology slice(s), for use by the routers in forwarding traffic using the Flexible Algorithm topology slices(s). It is noted that, if a receiving router is not capable to decode the extensions used for advertising Flexible Algorithm slice identifiers and/or Flexible Algorithm topology slice configurations, then the router will construct a forwarding entry using the standard Flexible Algorithm topology graph without Flexible Algorithm slicing support.

Flexible Algorithm Topology Slicing, as indicated above, may be supported by routers configured to perform Flexible Algorithm functions as well as extensions to Flexible Algorithm functions.

Flexible Algorithm Topology Slicing, as indicated above, may be supported by routers configured to perform extensions to Flexible Algorithm functions that include functions related to support for a node SID slice identifier. This information may be advertised by a router, when the router is advertising its SR Node SID, using opaque transitive IGP extensions. A participating SR router will receive the node SIDs from other participating routers and these SIDs may have the slice identifier associated therewith. The routers which receive the node SID with the slice identifier will decode the slice identifier and assign the associated slice properties for the slice identifier to the node SID to support SID-based differentiated services for traffic using the node SID. For backward compatibility, optional transitive opaque IGP extensions may be used for advertising the slice identifiers for the nodes SIDs, thereby enabling nodes which do not understand the optional transitive opaque IGP extensions to ignore the slice identifier and to operate as if the information never existed. Similarly, for backward compatibility, since it is not guaranteed that a recipient router supports Flexible Algorithm Topology Slicing, then if a recipient router cannot decode the slice identifier it will forward transit packets as if the Flexible Algorithm topology slice does not exist (i.e., the packets will be forwarded via the Flexible Algorithm topology graph unaware of the existence of the availability of the Flexible Algorithm topology slice in the Flexible Algorithm topology graph). Similarly, for backward compatibility, since it is not guaranteed that a recipient router capable of Flexible Algorithm Topology Slicing has Flexible Algorithm topology slice configuration information for each slice identifier, then a recipient router will forward transit packets as if the Flexible Algorithm topology slice does not exist (i.e., the packets will be forwarded via the Flexible Algorithm topology graph unaware of the existence of the availability of the Flexible Algorithm topology slice in the Flexible Algorithm topology graph).

Flexible Algorithm Topology Slicing, as indicated above, may be supported by routers configured to perform extensions to Flexible Algorithm functions that include functions related to support for slice properties of the Flexible Algorithm topology slices. This information may be advertised by an element (e.g., by a router, a central controller, or the like) that is already advertising the Flexible Algorithm topology descriptions for the Flexible Algorithm topologies. This information may be advertised using opaque transitive IGP extensions. A participating SR router will receive the slice properties of the Flexible Algorithm topology slices and associate the slice properties of the Flexible Algorithm topology slices with the slice identifiers of the Flexible Algorithm topology slices. A participating router, upon receiving a node SID having a slice identifier associated therewith, may use the slice properties of the Flexible Algorithm topology slice for the slice identifier to generate a node SID forwarding construct configured to map the node SID for the Flexible Algorithm topology slice and the slice identifier for the Flexible Algorithm topology slice to the slice properties of the Flexible Algorithm topology slice. For backward compatibility, optional transitive opaque IGP extensions may be used for advertising the slice properties of the Flexible Algorithm topology slices, thereby enabling nodes which do not understand the optional transitive opaque IGP extensions to ignore the slice properties of the Flexible Algorithm topology slices and to operate as if the information never existed. Similarly, for backward compatibility, since it is not guaranteed that a recipient router capable of Flexible Algorithm Topology Slicing has Flexible Algorithm topology slice configuration information for each slice identifier, then a recipient router will forward transit packets as if the Flexible Algorithm topology slice does not exist (i.e., the packets will be forwarded via the Flexible Algorithm topology graph unaware of the existence of the availability of the Flexible Algorithm topology slice in the Flexible Algorithm topology graph).

It is noted that the use of such Flexible Algorithm Topology Slicing capabilities to support service differentiation within Flexible Algorithms may be supported by using the standardized Flexible Algorithms to create constrained topology graphs (an example of which is presented in FIG. 2), advertising mapping of the slice identifiers to the associated slice properties of the Flexible Algorithm topology slices (an example of which is presented in FIG. 3), and building the Flexible Algorithm topology slices by advertising the node SIDs and associated slice identifiers of the Flexible Algorithm topology slices.

Figure 2:
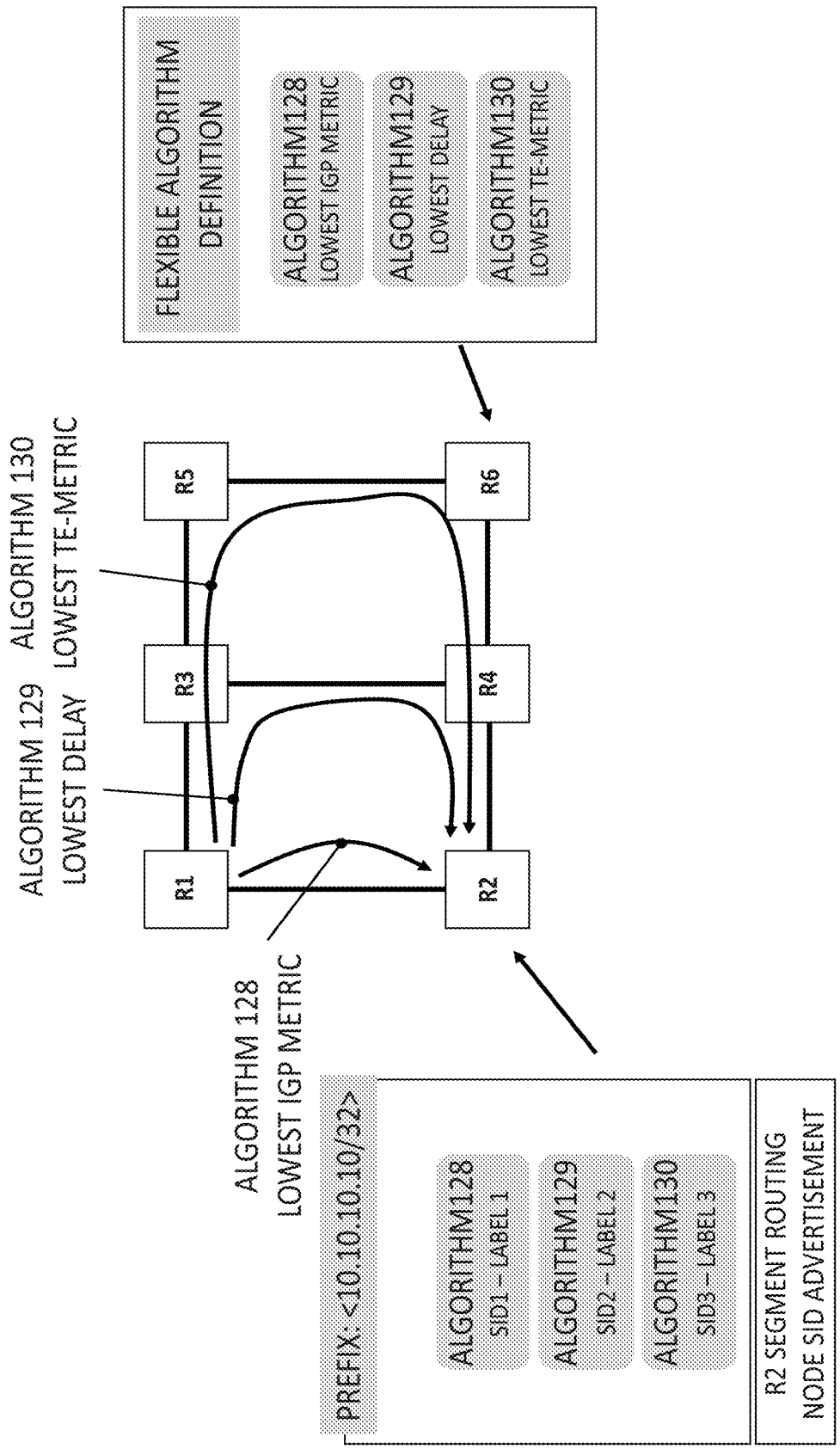
FIG. 2 depicts an example network for illustrating use of the standardized Flexible Algorithms to create constrained topology graphs.

FIG. 2 depicts an example network for illustrating use of the standardized Flexible Algorithms to create constrained topology graphs. In FIG. 2, the network 200 includes six routers labeled as R1 through R6, respectively. The standardized Flexible Algorithms support the creation of multiple forwarding graphs imposed upon a single physical network topology. The creation of the Flexible Algorithm forwarding graphs for the Flexible Algorithms is based on advertisement of the FADs which describe the characteristics of the Flexible Algorithms and, thus, of the Flexible Algorithm forwarding graphs (illustrated with respect to node R6) and advertisement of the node SIDs of the Flexible Algorithms (illustrated with respect to node R2). For example, Algorithm 128 is the shortest path using the lowest IGP metric, Algorithm 129 is the shortest path using the Delay metric, and Algorithm 130 is the shortest path using the TE-metric. For example, SID1 is advertised for Algorithm 128, SID2 is advertised for Algorithm 129, and SID3 is advertised for Algorithm 130. The Flexible Algorithm forwarding graphs are illustrated in FIG. 2 (illustrated by paths in the example of FIG. 2). The traffic sent based on a given Flexible Algorithm is sent over the Flexible Algorithm forwarding graph of the Flexible Algorithm. In the absence of Flexible Algorithm topology slices for a Flexible Algorithm, the traffic that is sent over the Flexible Algorithm forwarding graph of the Flexible Algorithm is handled equally as there is no support for service differentiation.

Figure 3:
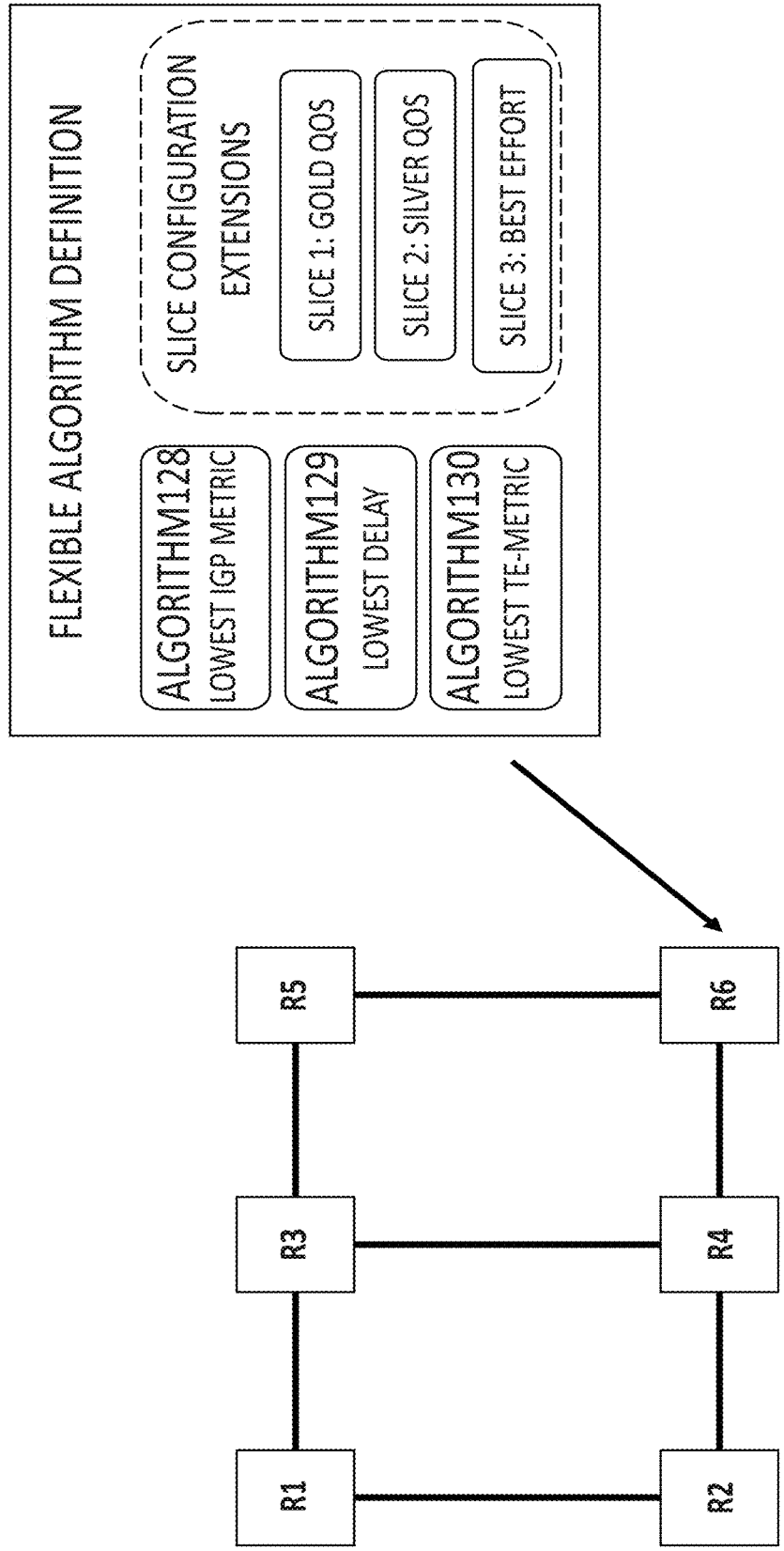
FIG. 3 depicts an example network for illustrating advertising of the mapping of the slice identifiers to the associated slice properties of the Flexible Algorithm topology slices.

FIG. 3 depicts an example network for illustrating advertising of the mapping of the slice identifiers to the associated slice properties of the Flexible Algorithm topology slices. In FIG. 3, the network 300 includes six routers labeled as R1 through R6, respectively, similar to the routers of the network 200 of FIG. 2. The slice identifiers and associated slice properties of the Flexible Algorithm topology slices may be advertised as transitive optional opaque information (e.g., using an opaque information extension to the advertisement of the FADs of the Flexible Algorithms), such that, if a node does not understand the information, the node may simply skip the decoding of the information and operate as if the information does not exist). The slice identifiers and associated slice properties of the Flexible Algorithm topology slices are received and decoded by the routers and maintained by the routers for supporting use of the Flexible Algorithm topology slices to support service differentiation within the Flexible Algorithm topologies in which the Flexible Algorithm topology slices are used. It is noted that, if a router does not understand the information (e.g., the router does not support the opaque information extension to the advertisement of the FADs of the Flexible Algorithms), then the router cannot decode the information and will operate as if the slice identifiers and associated slice properties of the Flexible Algorithm topology slices do not exist, and, thus, as if the Flexible Algorithm topology slices do not exist. It is further noted that, when a router does not support the Flexible Algorithm topology slices, then all of the SIDs will be forwarded by the router according to the intended Flexible Algorithm forwarding graph (path) without application of any SID-based services of the Flexible Algorithm topology slices. In the example of FIG. 3, three slices are defined as follows: (1) slice ID=Slice 1 provides a GOLD QoS service, (2) slice ID=2 provides a SILVER QoS service, and (3) slice ID=3 provides a Best Effort service. It will be appreciated that few or more Flexible Algorithm topology slices may be supported, Flexible Algorithm topology slices may be based on other service characteristics, Flexible Algorithm topology slices may be assigned different slice ID, or the like, as well as various combinations thereof.

Figure 4:
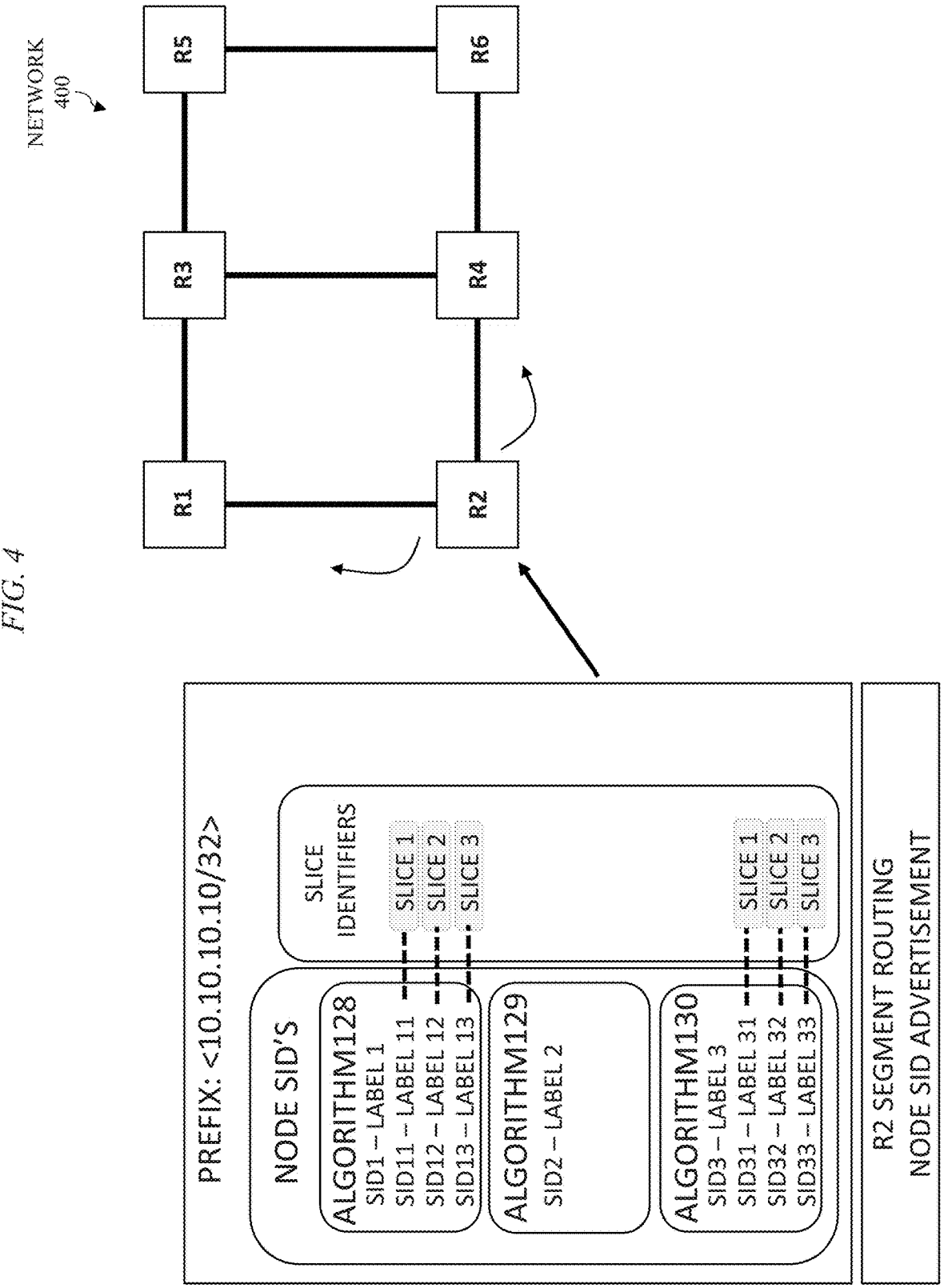
FIG. 4 depicts an example network for illustrating building of the Flexible Algorithm topology slices by advertising the node SIDs and associated slice identifiers of the Flexible Algorithm topology slices.

FIG. 4 depicts an example network for illustrating building of the Flexible Algorithm topology slices by advertising the node SIDs and associated slice identifiers of the Flexible Algorithm topology slices. In FIG. 4, the network 400 includes six routers labeled as R1 through R6, respectively, similar to the routers of the network 300 of FIG. 3. The slice identifiers may be advertised as transitive optional opaque information (e.g., using an opaque information extension to the advertisement of the node SIDs), such that, if a node does not understand the information, the node may simply skip the decoding of the information and operate as if the information does not exist).

As depicted in FIG. 4, R2 with IP address 10.10.10.10/32 is advertising 9 SR SIDs as follows. For algorithm 128, R2 advertises four SIDs including SID1 (which is the default SID for the standard algorithm 128) and the SIDS SID11, SID12, and SID13 (each of which is enriched with an opaque slice identifier for slice1 of algorithm 128, slice2 of algorithm 128, and slice3 of algorithm 128, respectively). For algorithm 129, R2 advertises one SID which is SID2 without advertising any slicing information. For algorithm 130, R2 advertises four SIDs including SID3 (which is the default SID for the standard algorithm 130) and the SIDS SID31, SID32, and SID33 (each of which is enriched with an opaque slice identifier for slice1 of algorithm 130, slice2 of algorithm 130, and slice3 of algorithm 130, respectively).

In FIG. 4, the configuration means that, for R1 to reach 10.10.10.10 within the algorithm 128 graph, there are four Flexible Algorithm topology slices available as follows: (1) with SID1, the traffic is forwarded over the shortest IGP metric path, using the default configurations (no special QoS or any other special services), (2) with SID11, the traffic is forwarded over the shortest IGP metric path, enforcing GOLD QoS handling, (3) with SID12, the traffic is forwarded over the shortest IGP metric path, enforcing SILVER QoS handling, and (4) with SID13, the traffic is forwarded over the shortest IGP metric path, enforcing BEST EFFORT QoS handling.

In FIG. 4, the configuration means that, for R1 to reach 10.10.10.10 within the algorithm 129 graph, the only path available within the algorithm 129 graph is the default Flexible Algorithms path for lowest delay available: with SID2, the traffic is forwarded over the shortest delay metric path, using the default configurations.

In FIG. 4, the configuration means that, for R1 to reach 10.10.10.10 within the algorithm 130 graph, there are four Flexible Algorithm topology slices available as follows: (1) with SID3, the traffic is forwarded over the shortest TE-metric path, using the default configurations (no special QoS or any other special services), (2) with SID31, the traffic is forwarded over the shortest TE-metric path, enforcing GOLD QoS handling, (3) with SID32, the traffic is forwarded over the shortest TE-metric path, enforcing SILVER QoS handling, and (4) with SID33, the traffic is forwarded over the shortest TE-metric path, enforcing BEST EFFORT QoS handling.

Figure 5:
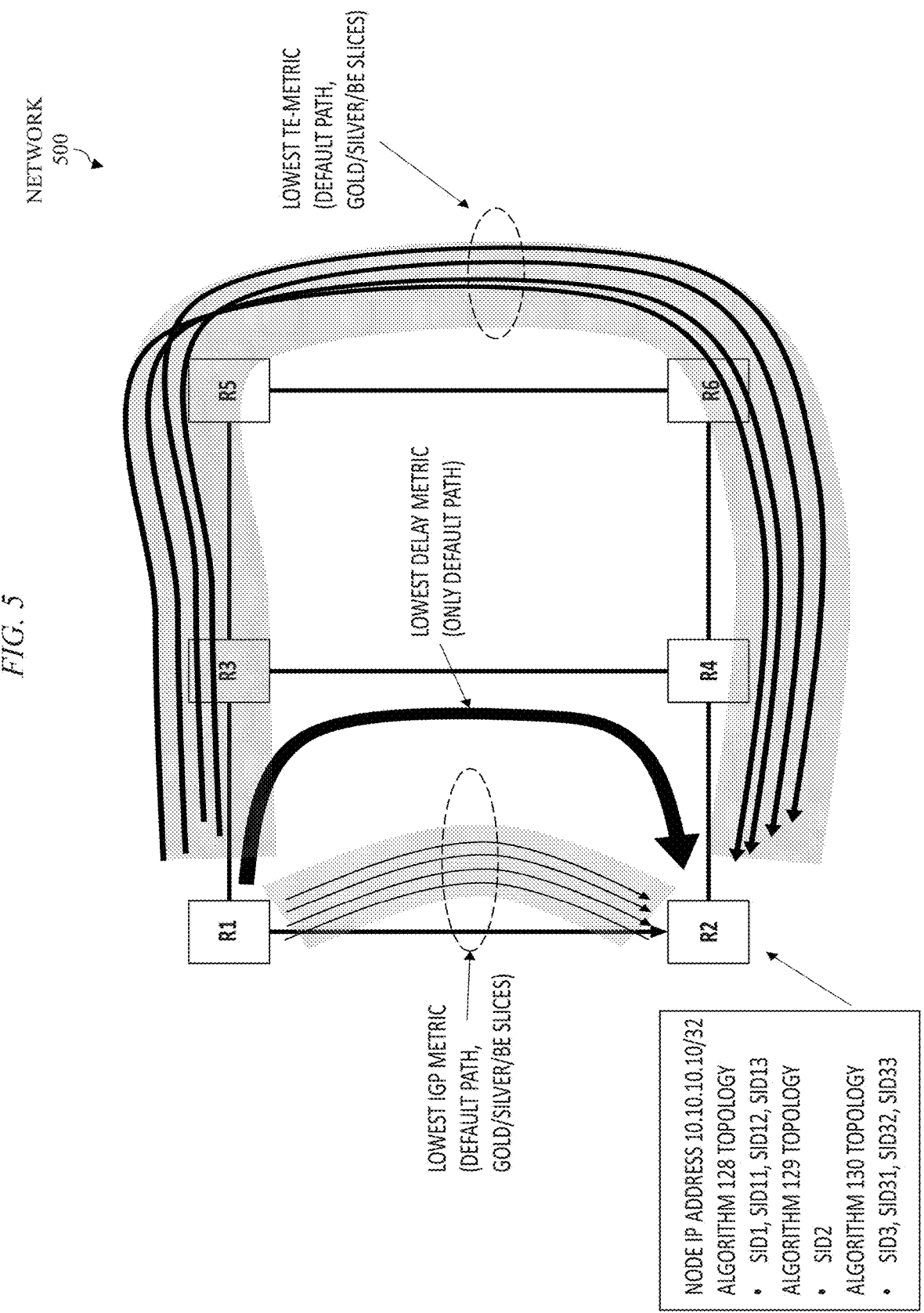
FIG. 5 depicts an example network for illustrating the Flexible Algorithm topology slices of FIG. 4.

FIG. 5 depicts an example network for illustrating the Flexible Algorithm topology slices of FIG. 4. In FIG. 5, the network 500 includes six routers labeled as R1 through R6, respectively, similar to the routers of the network 400 of FIG. 4. As depicted in FIG. 5, the network 500 supports nine paths from R1 to R2 as follows. For algorithm 128, the network 500 supports four paths from R1 to R2, including the default path associated with the SID1 (which is the default SID for the standard algorithm 128) and the three slice paths associated with the SIDs SID11, SID12, and SID13 (which are the paths for slice1 of algorithm 128 (GOLD), slice2 of algorithm 128 (SILVER), and slice3 of algorithm 128 (BE), respectively). For algorithm 129, the network 500 supports a single path from R1 to R2, which is the default path associated with the SID2 (which is the default SID for the standard algorithm 129). For algorithm 130, the network 500 supports four paths from R1 to R2, including the default path associated with the SID3 (which is the default SID for the standard algorithm 130) and the three slice paths associated with the SIDs SID31, SID32, and S1D33 (which are the paths for slice1 of algorithm 130 (GOLD), slice2 of algorithm 130 (SILVER), and slice3 of algorithm 130 (BE), respectively).

Figure 6:
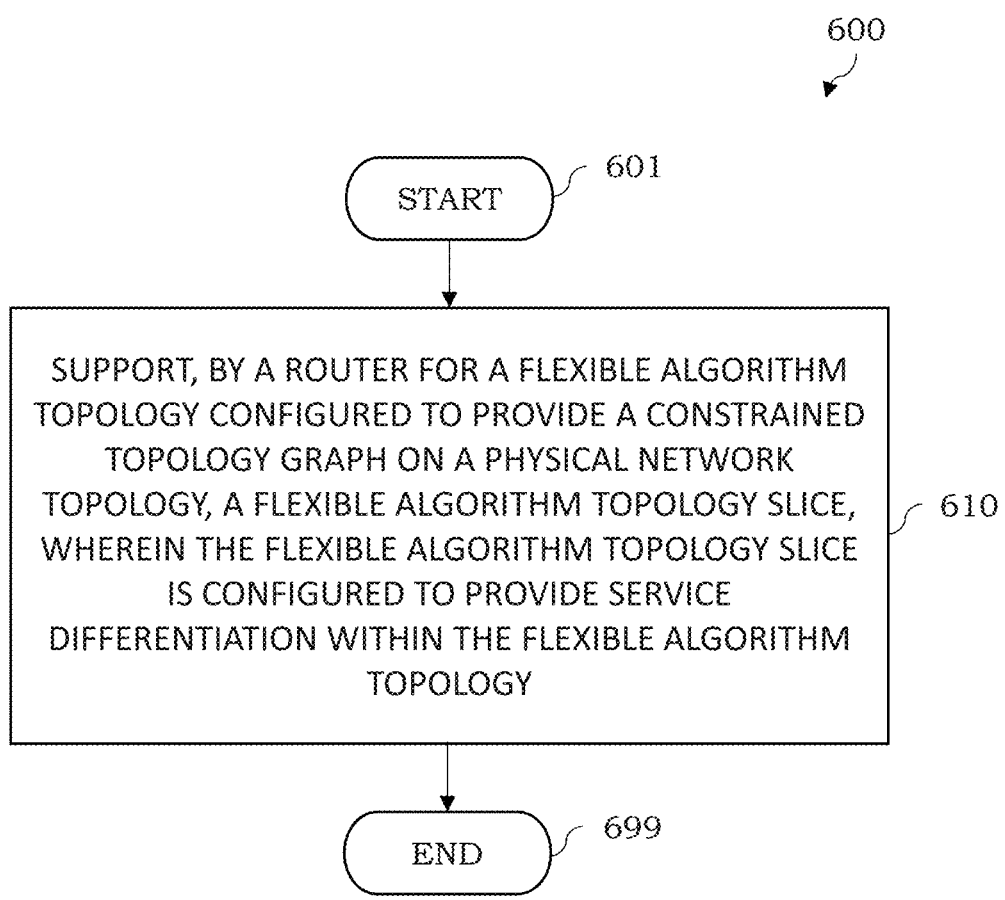
FIG. 6 depicts an example embodiment of a method to support service differentiation in a constrained network topology in a communication network.

FIG. 6 depicts an example embodiment of a method to support service differentiation in a constrained network topology in a communication network. It will be appreciated that although primarily presented as being performed serially, at least a portion of the blocks of method 600 may be performed contemporaneously or in a different order than as presented in FIG. 6. At block 601, the method 600 begins. At block 610, support, by a router for a flexible algorithm topology configured to provide a constrained topology graph on a physical network topology, a flexible algorithm topology slice, wherein the flexible algorithm topology slice is configured to provide service differentiation within the flexible algorithm topology. At block 699, the method 600 ends.

It will be appreciated that, although primarily presented herein within the context of supporting constrained topology slicing in particular types of constrained topologies which may be based on particular types of constrained topology technologies (namely, Flexible Algorithm topology graphs that are based on Flexible Algorithm technologies such as Flexible Algorithm standards or related Flexible Algorithm technologies), various example embodiments presented herein may be used or adapted for use in supporting constrained topology slicing in various other types of constrained topologies which may be based on various other types of constrained topology technologies. In at least some example embodiments, an apparatus may be configured to support, by a router for a constrained topology graph on a physical network topology, a constrained topology slice, wherein the constrained topology slice is configured to provide service differentiation within the constrained topology graph. In at least some example embodiments, the apparatus may be configured to advertise, by the router, a node identifier for the constrained topology slice and an associated slice identifier for the constrained topology slice. In at least some example embodiments, the apparatus may be configured to advertise, by the router, a slice identifier for the constrained topology slice and a constrained topology slice description for the constrained topology slice. It will be appreciated that any other functions presented herein as being specific to Flexible Algorithm topologies and Flexible Algorithm topology slicing may be read more generally in such example embodiments as being adapted for use in constrained topology slicing.

Various example embodiments for supporting service differentiation in constrained network topologies in communication networks may provide various advantages or potential advantages.

For example, various example embodiments for supporting service differentiation in constrained network topologies may be configured to obviate the need for use of DiffServ (which generally is complex for operators since the operators must configure and maintain separate mappings and QoS behavior on each node, and edge routers potentially rewrite payload headers which is undesirable since special measures need to be taken to avoid breaking payload packet transparency) in order to support differentiated services, as Flexible Algorithm topology slicing introduces per-hop node behavior based on the programmed SR SIDs (instead of the QoS or TC payload header bits) and makes it easier for operators to be transparent (QoS bits) for transit packets and makes it easier for operators to manage differentiated services in a network environment (e.g., since there is no need for remapping or remarking).

For example, various example embodiments for supporting service differentiation in constrained network topologies may be configured to obviate the need for use of Resource Reservation Protocol-Traffic Engineering (RSVP-TE) (which generally is difficult extend beyond traffic engineering and QoS as each node along the path must support new extensions and behave accordingly) in order to support differentiated services, as Flexible Algorithm topology slicing can autodiscover the network wide topology graph (e.g., a central node advertises the definition of each topology slice, and each node in the network participating in "Flexible Algorithm Topology Slicing" will create network wide consistent topology graphs) and standard Flexible Algorithms can create a stateless topology graph which may be inherited by the Flexible Algorithm Topology Slicing technology (e.g., each slice riding over the Flexible Algorithm topology graphs may have its own unique packet forwarding behavior imposed).

For example, various example embodiments for supporting service differentiation in constrained network topologies may be configured to obviate the need for use of Segment Routing-Traffic Engineering (SR-TE) (which generally requires that all traffic flowing over an SR-TE tunnel is exposed to the same service handling without any form of service differentiation unless QoS or TC DiffSery bits are used to impose differentiated behavior, which has various complications as discussed above with respect to DiffServ) in order to support differentiated services, as Flexible Algorithm topology slicing introduces per-hop node behavior based on the programmed SR SIDs (instead of the QoS or TC payload header bits) and makes it easier for operators to be transparent (QoS bits) for transit packets and makes it easier for operators to manage differentiated services in a network environment (e.g., since there is no need for remapping or remarking).

For example, various example embodiments for supporting service differentiation in constrained network topologies may be configured to obviate the need for use of Segment Routing-Policy (SR-Policy) (which generally requires that all traffic flowing over an SR-Policy path is exposed to the same service handling without any form of service differentiation unless QoS or TC DiffSery bits are used to impose differentiated behavior, which has various complications as discussed above with respect to DiffServ) in order to support differentiated services, as Flexible Algorithm topology slicing introduces per-hop node behavior based on the programmed SR SIDs (instead of the QoS or TC payload header bits) and makes it easier for operators to be transparent (QoS bits) for transit packets and makes it easier for operators to manage differentiated services in a network environment (e.g., since there is no need for remapping or remarking).

For example, various example embodiments for supporting service differentiation in constrained network topologies may be configured to obviate the need for use of Class Based Forwarding (CBF) (which generally employs tunnels which typically use QoS or TC bits for hop-by-hop packet handling and generally requires manual configuration of policies on network ingress nodes) in order to support differentiated services, as Flexible Algorithm topology slicing adds SID-based service differentiation within a single inherited Flexible Algorithm topology graph (although it will be appreciated that CBF may be used in conjunction with Flexible Algorithm Topology Slicing to add SDN-based slicing).

Various example embodiments for supporting service differentiation in constrained network topologies in communication networks may provide various other advantages or potential advantages.

Various example embodiments for supporting service differentiation in constrained network topologies in communication networks may provide various advantages or potential advantages. For example, various example embodiments for supporting service differentiation in constrained network topologies may be configured to support service differentiation within Flexible Algorithm forwarding graphs without the need for manual configuration of each of the nodes of the Flexible Algorithm forwarding graphs. For example, various example embodiments for supporting service differentiation in constrained network topologies may be configured to support SID-based service differentiation. For example, various example embodiments for supporting service differentiation in constrained network topologies may be configured to support auto-discovery by participating routers for Flexible Algorithm topology slices. For example, various example embodiments for supporting service differentiation in constrained network topologies may be configured to provide a central programmatic approach that simplifies service management per slice (e.g., obviating the need for per-box configuration). For example, various example embodiments for supporting service differentiation in constrained network topologies may be configured to provide SDN-based slicing technology (e.g., central configuration with auto-discovery of the configurations). For example, various example embodiments for supporting service differentiation in constrained network topologies may be configured to support backwards compatibility with existing Flexible Topology implementations such that, if a node does not support the extensions of Flexible Algorithm Topology Slicing, the node may fall back to a regular Flexible Algorithm topology graph. For example, various example embodiments for supporting service differentiation in constrained network topologies may be configured to provide a simplified mechanism to map traffic to more enhanced service classes supported by the Flexible Algorithm topology slices. For example, various example embodiments for supporting service differentiation in constrained network topologies may be configured such that various example embodiments of Flexible Algorithm Topology Slicing automatically may inherit various advanced capabilities of regular Flexible Algorithm topology graphs (e.g., loop-free alternate (LFA), micro-loop avoidance, inter-area support, and so forth). For example, various example embodiments for supporting service differentiation in constrained network topologies may be configured to provide various example embodiments of Flexible Algorithm Topology Slicing as simple add-ons to existing networks (e.g., a ship-in-the-night solution). For example, various example embodiments for supporting service differentiation in constrained network topologies may be configured to provide various example embodiments of Flexible Algorithm Topology Slicing based on simple control plane extensions (e.g., extensions to IS-IS, OSPF, BGP-LS, or other protocols which may be used within the context of Flexible Algorithm Topology and/or Flexible Algorithm Topology Slicing). For example, various example embodiments for supporting service differentiation in constrained network topologies may be configured to support service differentiation based on network slicing in various types of communication networks which may utilize various types of communications technologies (e.g., supporting 5G network slicing by extending 5G network slices to WAN network slices using SDN interfaces). Various example embodiments for supporting service differentiation in constrained network topologies in communication networks may provide various other advantages or potential advantages.

Figure 7:
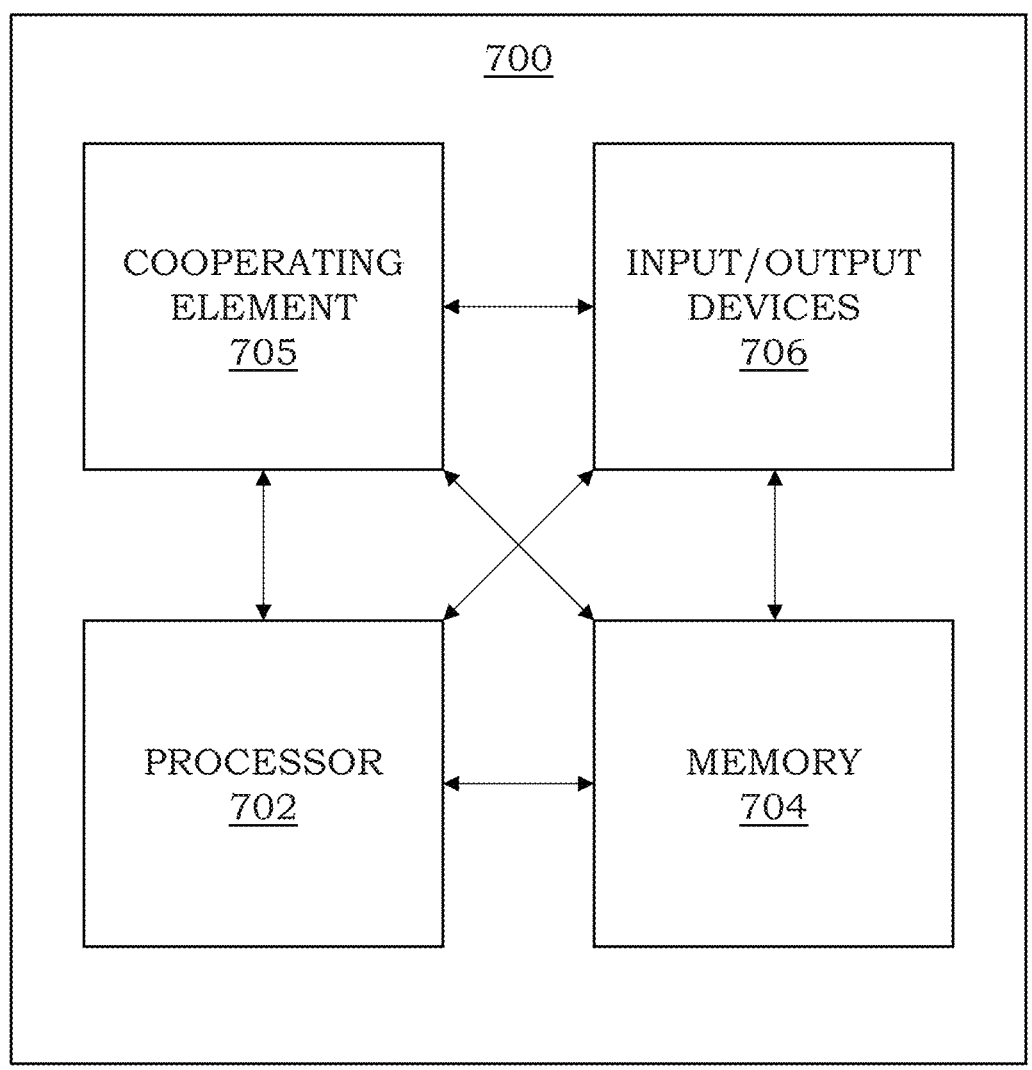
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including a set of instructions, wherein the set of instructions is configured to, when executed by the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A first router, comprising:
   at least one processor; and
   at least one memory storing instructions that, when executed by the at least one processor, cause the first router to:
   receive, for a segment routing flexible algorithm, flexible algorithm definition information, wherein the flexible algorithm definition information includes a flexible algorithm definition defining the segment routing flexible algorithm, wherein the flexible algorithm definition information includes a flexible algorithm topology slice description and a slice identifier for the flexible algorithm topology slice description;
   receive, from a second router, advertising information, wherein the advertising information includes a first node segment identifier of the second router for the segment routing flexible algorithm, wherein the advertising information includes a second node segment identifier of the second router for the segment routing flexible algorithm and the slice identifier for the flexible algorithm topology slice description; and send, toward the second router based on the flexible algorithm definition information and the advertising information, a first packet using a first flexible algorithm topology slice of the segment routing flexible algorithm based on inclusion of the first node segment identifier in the first packet and a second packet using a second flexible algorithm topology slice of the segment routing flexible algorithm based on inclusion of the second node segment identifier in the second packet.

2. The first router of claim 1, wherein the first flexible algorithm topology slice defines a first service level for the segment routing flexible algorithm, wherein the second flexible algorithm topology slice defines a second service level for the segment routing flexible algorithm.

3. The first router of claim 2, wherein the first service level is based on a first set of quality-of-service properties, wherein the second service level is based on a second set of quality-of-service properties that is different than the first set of quality-of-service properties.

4. The first router of claim 2, wherein the first service level is a default service level for the segment routing flexible algorithm, wherein the second service level is configured to provide service differentiation within a flexible algorithm topology of the segment routing flexible algorithm.

5. The first router of claim 1, wherein the advertising information is received based on a routing protocol.

6. The first router of claim 5, wherein the slice identifier for the flexible algorithm topology slice description is received using at least one optional transitive opaque extension of the routing protocol.

7. The first router of claim 5, wherein the routing protocol includes at least one of an Open Shortest Path First (OSPF) protocol, an Intermediate-System-to-Intermediate-System (IS-IS) protocol, or a Border Gateway Protocol-Link State (BGP-LS) protocol.

8. The first router of claim 1, wherein the flexible algorithm topology slice description includes a set of quality-of-service properties configured to provide service differentiation within the segment routing flexible algorithm.

9. The first router of claim 1, wherein the flexible algorithm definition information is received based on a routing protocol.

10. The first router of claim 9, wherein the flexible algorithm topology slice description and the slice identifier for the flexible algorithm topology slice description are received using at least one optional transitive opaque extension of the routing protocol.

11. The first router of claim 9, wherein the routing protocol includes at least one of an Open Shortest Path First (OSPF) protocol, an Intermediate-System-to-Intermediate-System (IS-IS) protocol, or a Border Gateway Protocol-Link State (BGP-LS) protocol.

12. The first router of claim 1, wherein the flexible algorithm definition information is received from a segment routing enabled router.

13. The first router of claim 1, wherein the flexible algorithm definition information is received from a network controller.

14. The first router of claim 1, wherein the instructions, when executed by the at least one processor, cause the apparatus to:

generate, based on the flexible algorithm definition information and the advertising information, a forwarding construct configured to map the first node segment identifier of the second router for the segment routing flexible algorithm to the flexible algorithm definition defining the segment routing flexible algorithm.

15. The first router of claim 1, wherein the instructions, when executed by the at least one processor, cause the apparatus to:

generate, based on the flexible algorithm definition information and the advertising information, a forwarding construct configured to map the second node segment identifier of the second router for the segment routing flexible algorithm to the flexible algorithm definition defining the segment routing flexible algorithm and to the flexible algorithm topology slice description.

16. The first router of claim 1, wherein the first flexible algorithm topology slice of the segment routing flexible algorithm is based on at least one of a delay metric, a routing protocol metric, or a traffic engineering metric.

17. The first router of claim 1, wherein the second flexible algorithm topology slice of the segment routing flexible algorithm is based on at least one of a quality-of-service parameter, a traffic metering parameter, a flow enhancer parameter, a security parameter, or an optimization parameter.

18. A router, comprising:
at least one processor; and
at least one memory storing instructions that, when executed by the at least one processor, cause the router to:
receive, for a segment routing flexible algorithm, flexible algorithm definition information, wherein the flexible algorithm definition information includes a flexible algorithm definition defining the segment routing flexible algorithm, wherein the flexible algorithm definition information includes a flexible algorithm topology slice description and a slice identifier for the flexible algorithm topology slice description;
send, for a segment routing flexible algorithm, a first advertisement for a first flexible algorithm topology slice supported by the router for the segment routing flexible algorithm, wherein the first advertisement includes a first node segment identifier of the router for the segment routing flexible algorithm;
send, for the segment routing flexible algorithm, a second advertisement for a second flexible algorithm topology slice supported by the router for the segment routing flexible algorithm, wherein the second advertisement includes a second node segment identifier of the router for the segment routing flexible algorithm and the slice identifier of the flexible algorithm topology slice description; and
receive, by the router, a first packet including the first node segment identifier based on the first flexible algorithm topology slice and a second packet including the second node segment identifier based on the second flexible algorithm topology slice.

19. A first router, comprising:
at least one processor; and
at least one memory storing instructions that, when executed by the at least one processor, cause the first router to:
receive, for a segment routing flexible algorithm, flexible algorithm definition information, wherein the flexible algorithm definition information includes a flexible algorithm definition defining the segment routing flexible algorithm, wherein the flexible algorithm definition information includes a flexible algorithm topology slice description and a slice identifier for the flexible algorithm topology slice description;

receive, for a segment routing flexible algorithm, a first advertisement of a second router for a first flexible algorithm topology slice of the segment routing flexible algorithm, wherein the first advertisement includes a first node segment identifier of the second router for the segment routing flexible algorithm;

receive, for the segment routing flexible algorithm, a second advertisement of the second router for a second flexible algorithm topology slice of the segment routing flexible algorithm, wherein the second advertisement includes a second node segment identifier of the second router for the segment routing flexible algorithm and the slice identifier of the flexible algorithm topology slice description; and send, toward the second router, a first packet using the first flexible algorithm topology slice based on inclusion of the first node segment identifier of the second router in the first packet and a second packet using the second flexible algorithm topology slice based on inclusion of the second node segment identifier of the second router in the second packet.

* * * * *